Dec. 8, 1959    A. O. BRUESTLE ET AL    2,916,275
SOCKET-ENGAGING CUTTER BITS

Filed April 1, 1957    3 Sheets-Sheet 1

INVENTORS.
ARMIN O. BRUESTLE
AND CLAUDE B. KREKELER,
BY Allen & Allen
ATTORNEYS.

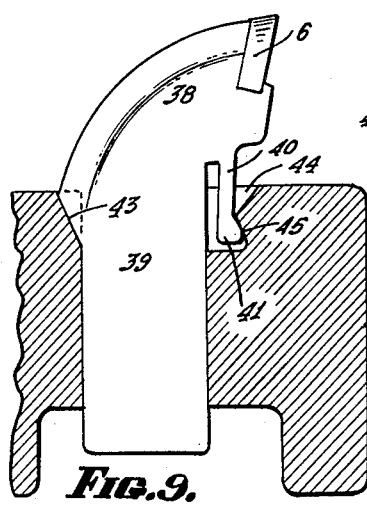
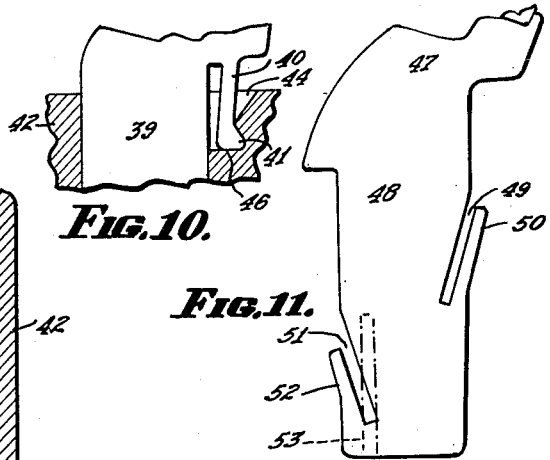
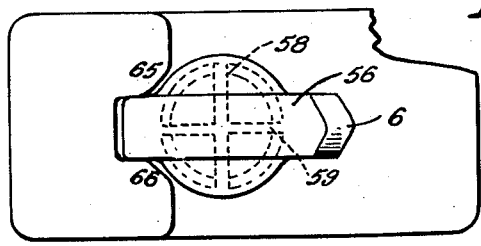
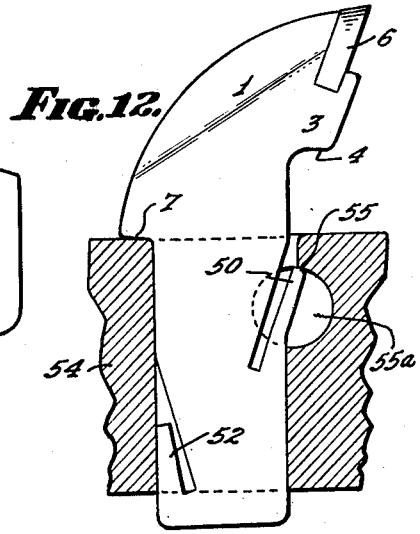
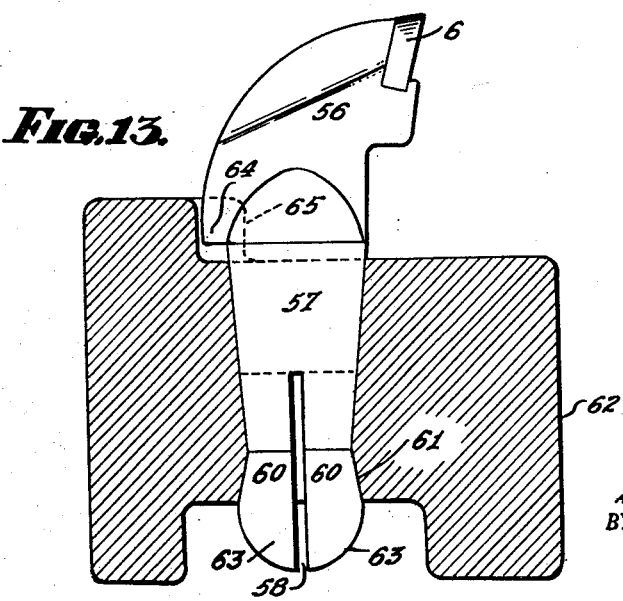

Dec. 8, 1959    A. O. BRUESTLE ET AL    2,916,275
SOCKET-ENGAGING CUTTER BITS
Filed April 1, 1957    3 Sheets-Sheet 3
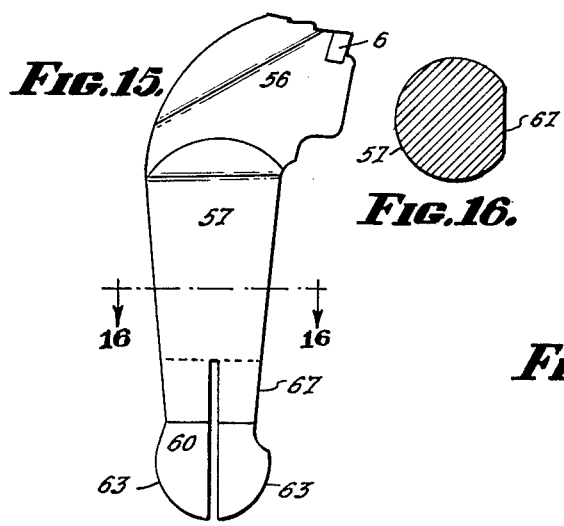
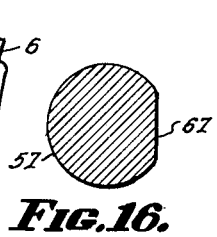
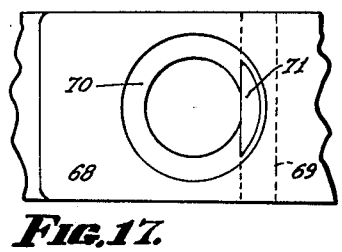
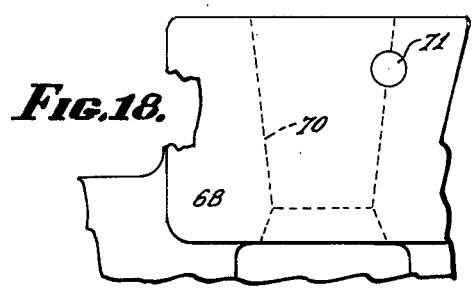
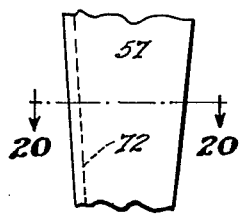
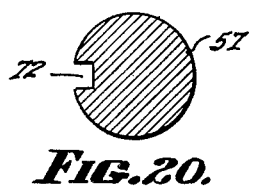
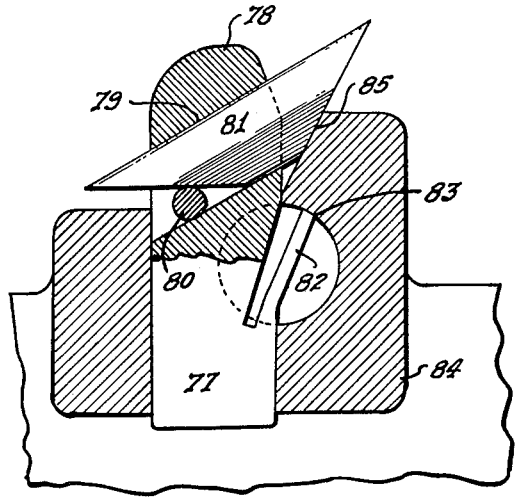
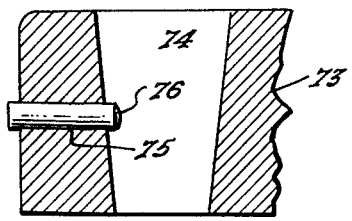
INVENTORS.
ARMIN O. BRUESTLE
AND CLAUDE B. KREKELER,
BY Allen & Allen
ATTORNEYS.

United States Patent Office 2,916,275
Patented Dec. 8, 1959

2,916,275

SOCKET-ENGAGING CUTTER BITS

Armin O. Bruestle and Claude B. Krekeler, Cincinnati, Ohio, assignors to The Cincinnati Mine Machinery Co., Cincinnati, Ohio, a corporation of Ohio Application April 1, 1957, Serial No. 649,956

26 Claims. (Cl. 262—33)

This application is related to our copending application Serial No. 646,409, filed March 15, 1957, now Patent No. 2,860,863, and entitled Cutter Bit and Like Structure. The invention will be described in connection with cutter bits for mining machinery, it being understood that the principals of the invention are applicable to other structures presenting similar problems.

In mining machinery, powered heads or chains are provided with members having recesses or perforations forming sockets for the reception of the shanks of cutter bits or cutter bit holders. The shanks are held in the socket members in various ways, including the use of set screws. It will be understood that the bits of mining machinery, as well as the heads or chain elements having the socket members, are subjected to very great stresses during the cutting operation, and are also subjected to excessive vibration. Consequently, it becomes necessary to hold the shanks in the sockets in such a way as to withstand the stresses, and also to provide against loosening under the combined effect of stresses and vibration.

Also, it will be understood that the powered heads or chains normally carry a plurality of cutter bits, the cutting points of all of which should be located at such distances from the socket members that each bit will do the desired amount of cutting. This is what is termed "gauge." In most styles of cutter bits, it is necessary in order to attain the proper gauge that the shanks of the cutter bits or bit holders enter the socket members to a fixed and accurate distance.

Mining machinery is subjected not only to physical wear, but also to the corrosive action of mine waters, many of which are acidic. Thus, it becomes practically impossible to maintain complete accuracy, particularly of the socket members. After a relatively short period of use, the socket members are likely to lose their power to retain tightly even the shanks of new bits.

In the said copending application we have described types of structure in which the shanks of cutter bits are provided with a taper or shaped as a wedge, the recesses or perforations in the socket members being correspondingly tapered. The shanks are driven into the socket members where they are held frictionally, i.e. by the wedging action. When it is desired to change bits the shanks are knocked loose or pried out of the sockets. In the structures of the copending application the shanks of the cutter bits are provided with slots extending inwardly from the ends of the shanks. These slots demark tongues having flexibility or resilience, and which act to retain the shank securely within the socket despite inaccuracies in the tapers of the members, wear, corrosion and the like. The slots are so proportioned and limited as to length that a sufficient part of the solid shank enters the tapered perforation to establish gauge, and the application also has to do with those angular relationships in the tapered shank and socket which are useful in providing tight engagement while maintaining gauge.

It is an object of the present invention to provide a structure having positive or non-frictional means for maintaining the shank in the socket member. With such means, reliance for holding is not alone on the frictional engagement of a wedge shaped element in a tapered perforation; and while a wedge shaped shank and socket element may be used, it becomes possible to dispense with the taper and to employ straight shanks and perforations while retaining the other advantages of the tongued construction.

Because of this it now becomes possible to rely for gauge on fixed abutment means; and it is an object of the invention to provide a cutter bit or holder construction of a type which can be driven in for use and knocked or pried out for replacement, but which uses fixed gauge abutments.

The invention pertains primarily to one-piece cutter bits and will be so described. However, it is possible to realize the invention in connection with structures involving a head and shank, the head being adapted for the holding of replaceable cutter bits.

The above and other objects of the invention which will be set forth hereinafter or will be apparent to one skilled in the art upon reading these specifications are accomplished by that construction and arrangement of parts of which certain exemplary embodiments will now be described. Reference is made to the accompanying drawings, wherein:

Figure 9 is a similar view showing a type of bit having a latching member near its upper end.

Figure 10 is a similar view showing a bottomed latching member.

Figure 11 is a partial side elevation of a cutter bit having a latching tongue and a tongue for resilient engagement.

Figure 12 is a view showing the structure of Figure 11 in use in a socket member.

Figure 13 is a side elevation of a cutter bit having a shank which is circular in cross section in use in a socket member (sectioned).

Figure 14 is a plan view of the structure of Figure 13.

Figure 15 is a partial elevational view of a bit of circular cross section showing means for preventing rotation.

Figure 16 is a sectional view taken along the section line 16—16 of Figure 15.

Figure 17 is a partial plan view of a socket member for use with the bit of Figure 15.

Figure 18 is a side elevation thereof.

Figure 19 is a partial elevational view of a bit of circular cross section showing another means for preventing rotation.

Figure 20 is a sectional view taken along the section line 20—20 of Figure 19.

Figure 21 is a vertical section of a socket member for use with the bit shank of Figure 19.

Figure 22 is a sectional view showing a socket member and a cutter bit construction which utilizes a removable cutter bit.

Figure 1:
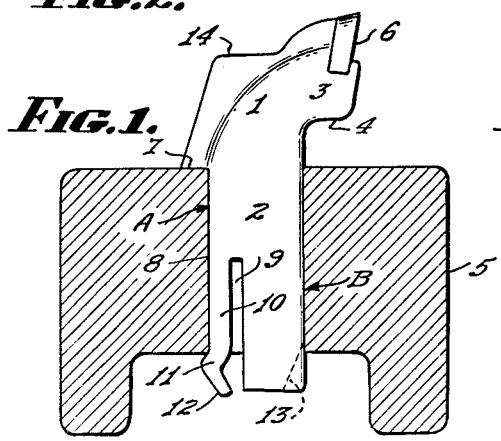
Figure 1 is a side elevation of a cutter bit with a socket member shown in section.

Referring first to Figure 1 there is shown a one-piece cutter bit having a head 1 and a shank 2. The head has a forward extension 3 the underside of which forms a shoulder 4 by means of which the shank may be pried out of a socket member 5, using a suitable lever curved or bent up at the working end. Bits of the one-piece type are usually provided with a cutting point 6 which is formed from a small block of Carboloy or other hard alloy such as tungsten carbide, inset in a groove in the bit head and welded or brazed thereto. In order to fix the gauge, the bit head is shown as provided with a shoulder or abutment 7 adapted to contact a top portion of the socket member 5. While this abutment has been shown at the rear of the head, it will be within the purview of the skilled worker to form it at the front or even at the sides of the head.

In the particular embodiment the bit shank 2 is rectangular in cross section, as is the perforation 8 in the socket member. Moreover, the bit shank is not wedge shaped as a whole. Nor is the perforation in the socket member.

The shank is provided with a slot 9 extending inwardly from the outer end thereof and demarking a tongue 10. The tongue 10 has flexibility and resilience, and is generally expanded outwardly during the manufacture of the bit. An outward displacement of from 10 to 40 thousandths of an inch is generally satisfactory; but the displacement may be considerably greater if desired depending upon the tightness of fit of the shank in the socket member.

The cutting thrusts in the bit of Figure 1 are borne at the areas marked A and B in the drawing. As a consequence the bit shank should have a reasonably accurate fit in the perforation in the socket member; but the fit need not be a driving fit since the resilient tongue 10 will take care of normal tolerances and inaccuracies due to wear and corrosion.

However, while the structure thus far described will provide a degree of frictional engagement of the straight shank in the straight perforation, it lacks the positive or nonfrictional means for holding the shank in the perforation. Such a means is provided by bending a lower portion of the tongue outwardly as at 11 and then inwardly as at 12. The perforations are such that when the shank is driven home in the perforation of the socket member, the abutment 7 lying against the top of the socket member, the outwardly bent portion 11 of the tongue will engage behind the edge of the socket member as shown, providing for a positive retention of the shank. At the same time the bit may be pried out of the socket member by a tool engaging the abutment 4, since the shape of the outwardly bent tongue portion 11 is such as to displace the tongue inwardly as the shank moves upwardly.

Where the end portion of the tongue is bent inwardly at 12 and lies aslant to the main tongue portion, the bit shank may readily be started into the perforation in the socket member 5 so long as the total width of the shank and tongue is no greater at the bottom than elsewhere. However, it is within the purview of the invention to bevel the lower front corner of the shank as shown at 13 to facilitate initial entry of the shank into the socket member.

It will be noted that the slot 9 does not extend the full length of the shank. This is to provide strength and eliminate resilience in the upper part of the shank opposite the bearing point A. In order to facilitate driving the bit into the socket member the bit heads in the structures of Figures 1, 2, 4, 5 and 9 to 15 of this invention may be shaped to provide a driving anvil at the point marked 14.

Figure 2:
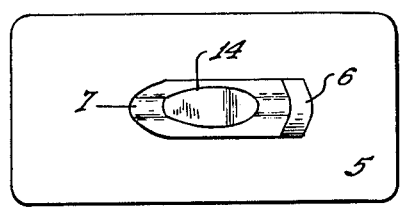
Figure 2 is a plan view of the structure of Figure 1.
Figure 3:
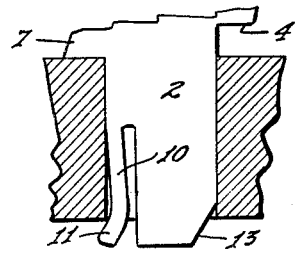
Figure 3 is a side elevation of a cutter bit engaged in a sectioned socket element showing a particular mode of engagement.

It is desirable to have the portion 11 engage snugly behind the edge of the socket member. If this does not occur, there is opportunity for endwise play of the shank in the socket. Some endwise play is tolerable since the thrusts of cutting are downwardly and inwardly. Moreover there is normally a frictional engagement also by reason of the resilience of the tongue 10. If the socket member is somewhat greater in vertical dimension, the engagement of the portion 11 will be as shown in Figure 3, the tongue 10 being inwardly deflected, and the action of the part 11 being to tend to draw the shank 2 downwardly in the socket perforation 8.

Figure 4:
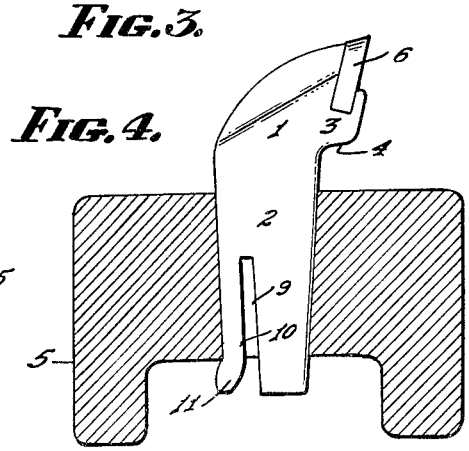
Figure 4 is a side elevation of a cutter bit in a sectioned socket showing another type of non-frictional holding means.
Figure 5:
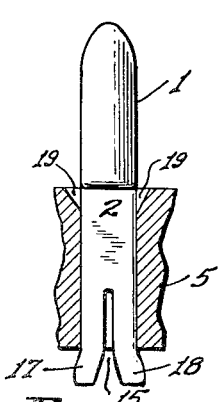
Figure 5 is an end elevation of a cutter bit in a sectioned socket showing another type of non-frictional holding means.

As shown in Figure 4, where like parts have been given like index numerals, the principles of the invention may be applied to a bit having a tapered or wedge shaped shank for use in a socket member having a wedge shaped perforation. In this event, the inwardly turned portion 12 on the end of the tongue may be eliminated since it is readily possible to make the width of the bit shank at the bottom no greater than the width of the perforation at the top. With a tapered or wedge construction, gauge may be determined by the construction itself; but since frictional engagement is not alone relied on to maintain the shank in the socket it becomes possible to provide an abutment for gauging purposes.

Figure 6:
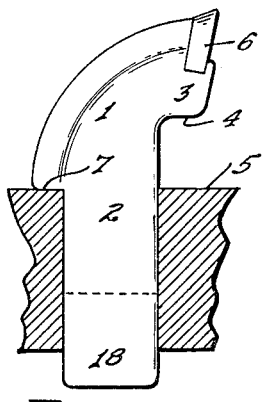
Figure 6 shows the same structure in side elevation.

In the structure of Figures 5 and 6, where again like parts have been given like index numerals, there is shown a straight-shanked bit engaged in a straight perforation in the socket member 5. In this instance the end portion of the shank has been split or slotted as at 15 in the direction of the shank width to provide two short tongues 17 and 18, both of which may be slightly outwardly displaced. When the bit shank is driven home, these tongues expand outwardly as shown providing a non-frictional shank retaining means which will effectively prevent dislodgement of the shank from the socket member under any strains encountered in use. In order to permit starting the shank into the socket upper portions of the socket member may be beleveled as at 19. While a straight shank and a straight perforation have been illustrated, it is possible to provide the structure of Figures 5 and 6 with a taper or wedge shape either in thickness or in width of both.

Figure 7:
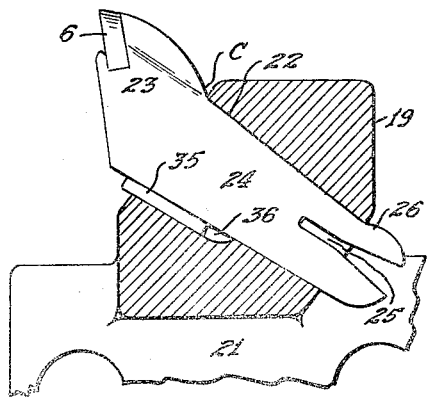
Figure 7 shows a type of cutter bit embodying the invention in which the shank enters the socket member at a substantial angle to the vertical.

In Figure 7 there is shown a socket member 19 forming part of a chain link element 21 of a mining machine. The socket element is perforated as at 22 at an angle of about 45° to the vertical. The bit shown comprises a head 23 and a shank 24. The lower end of the shank has been slotted as at 25 to provide a resilient tongue having an outwardly extending portion 26 adapted, when the shank is forced home in the socket member to engage behind it and provide a non-frictional retention means. While the shank and perforation in this instance have been shown as tapered or wedge shaped, they could be straight as will be readily apparent. Abutment means can be provided at the point marked C if desired.

Figure 8:
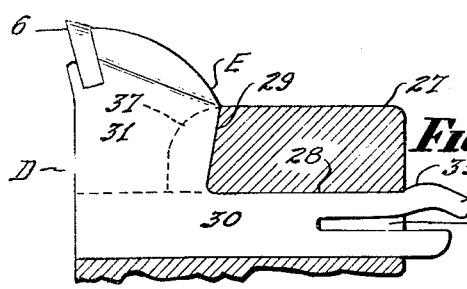
Figure 8 is a similar view showing the use of a type of cutter bit having a shank which enters the socket member substantially horizontally.

In Figure 8 the socket member 27 is provided with a horizontal perforation 28 and an abutment surface 29. The bit has a non-tapered shank 30 and a head 31 lying substantially at a right angle to the shank, and arranged to abut the surface 29 which sustains the cutting thrusts. The end of the shank is slotted as at 32 to provide a resilient tongue having an outturned retaining portion 33 and an inturned portion 34 for purposes hereinabove described. The bit in Figure 8 may be driven home by blows against the surface D and removed by blows delivered at the point E.

In Figures 7 and 8, the shanks 24 and 30 may, of course, have any cross sectional shape which will prevent rotation in the perforations 22 and 28 of the socket members. They may, however, be circular in cross section, in which event means to prevent rotation of the shanks in the socket members will be required. In Figure 7, the shank 24 has a key 35 entering a keyway 36 in the socket member. Again, those expedients may be employed which are hereinafter described in connection with Figures 15 to 21. In Figure 8, the side edges of the socket member have been prolonged beyond the surface 29 as at 37 so as to be along side the head 31 and prevent rotation.

In Figure 9 there is shown a cutter bit having a head 38 and a shank 39 which is straight or non-tapered. In this instance a resilient tongue 40 extends downwardly from the head in the general direction of the shank, and the tongue has either an enlargement or an outwardly bent portion 41 at its lower end. The shank of the structure is shown engaged in a straight or non-tapered perforation in the socket member 42. The bit could be provided with a gauging abutment similar to 7 in Figure 1, but in this instance is shown with a slanting abutment surface 43 engaging a similarly formed surface in the socket member. The upper portion of the socket member is cut away as at 44 to accommodate the tongue 40; and the cut away portion is so shaped as to present a surface 45 behind which the protuberance or outwardly bent portion 41 of the tongue engages so as to prevent withdrawal of the shank. The shank 39 has not been shown as provided with a resilient tongue at its lower end since, with a reasonable fitting of the parts, the resilience of the tongue 40 will be sufficient. However, the shank and the perforation in the socket member could both be made tapered, if desired, and with or without a resilient tongue in the lower portion of the shank.

In the embodiment of Figure 9 the coaction of the end portion 41 of the tongue and the surface 45 is to tend to draw the shank downwardly in the socket, until the gauge abutment 43 is seated. However, as shown in Figure 10, it is possible to configure the parts so that the end portion 41 of the tongue will bottom against the surface 46 of the recess 44. In this event the tongue will act to establish gauge, and no other gauge-establishing abutment need be provided.

Figure 11 shows a cutter bit having a head 47 and a shank 48. The shank has been slotted by angularly downwardly extending cuts. One of these is the slot 49 demarking an upwardly extending locking tongue 50 near the front top portion of the shank. The shank forging may be initially so shaped as to permit the milling of the slot 49 as will be clear from the figure. The other is the slot 51 demarking an upwardly extending tongue 52 near the lower rear corner of the shank. Instead of forming the tongue 52 in the way shown in Figure 11, it could have been formed as a downwardly extending tongue demarked by a slot 53 as will be understood by the skilled worker in the art.

Figure 12 shows the structure of Figure 11 in use in a socket member 54. The lower resilient tongue 52 maintains frictional engagement in the perforation, keeping the lower portion of the bit shank forward against the socket member. The upper resilient tongue 50 is shown engaged beneath an abutment 55 formed in the socket member as part of the socket member perforation, where it acts in a non-frictional fashion to prevent removal of the bit shank. The socket member is provided with a transverse perforation 55a as shown. When it is desired to remove the bit from the socket a drift pin is driven into the perforation 55a, displacing the tongue 50 so that it will pass the abutment 55. The bit may then be removed in the ordinary way by a tool engaging beneath the shoulder surface 4. The shank and perforation in Figure 12 could be tapered if desired. The action of the end of the tongue 50 against the lower surface of the abutment 55 will be to tend to draw the shank downwardly in the perforation.

The bit of Figure 13 has a head 56 to which is attached a shank 57 circular in cross section. This shank has crossing slots 58 and 59 dividing it into four resilient tongues. The body of the shank 57 is shown as tapered or conical in the figure, although it can be cylindrical if desired. The lower end of the shank is provided with a conical enlargement 60 which serves as the non-frictional retaining means since it engages a conical surface 61 of the perforation in the socket member 62. The remainder of the perforation is either conical or cylindrical depending upon the shape of the main portion of the bit shank. To facilitate entry of the bit shank into the perforation the lower enlarged portion 60 is provided with inwardly tapering leader elements 63 as shown.

Since the shank 57 is circular means are required in connection with the bit of Figures 13 and 14 to keep the bit from rotating under the strains of cutting. This may be accomplished in various ways. A rearward extension 64 roughly corresponding to the abutment 7, and capable of serving the same purpose when the shank is cylindrical, is shown as engaged between shoulders 65 and 66 formed on the socket member.

Another way of preventing rotation of the shank in the socket is illustrated in Figures 15 to 18. Here, the shank 57 is provided with a flat 67, while the socket member is provided with means coacting with the flat. This can be done by providing the socket member 68 with a transverse or horizontal perforation 69 which partially intersects the shank-receiving perforation 70. A pin 71 is driven into the perforation 69, and provides within the main perforation a surface coacting with the flat.

Again, as shown in Figures 19 to 21, the shank 57 may be provided with a keyway 72 extending longitudinally, while the socket member 73 may have its perforation 74 provided with a coacting key in some form. This can be accomplished by forming a horizontal or transverse perforation 75 in the socket member, and driving or press-fitting a pin 76 into it. The end of the pin, as it extends into the perforation, serves as a key.

Figure 22 illustrates the principles of the invention applied to a cutter bit construction which embodies a bit holder and a removable bit. Here, the bit holder comprises a shank 77 and a head 78. The head is provided with a bit-holding perforation 79 having a bottoming means 80 for a lower face of the bit 81. The bit is shown as trapezoidal in plan and diamond-shape in cross section, having a cutting point on each end. With appropriate shapes of head other removable or reversible cutter bits may be used, such as rhomboidal bits.

The shank 77 has an upwardly extending resilient tongue 82 which engages the under surface 83 of an abutment portion of the socket member 84, as generally explained in connection with Figure 12 above. The tongue tends to draw the shank 77 downwardly in the socket member. The bit 81 is retained in the head by the engagement of its forward face against a downwardly slanting surface of an upward extension 85 of the socket member. This engagement also serves to establish gauge, as will be evident.

The shank arrangement in structures like that shown in Figure 22 may be any of the arrangements shown and described hereinabove. In the claims which follow, the words "cutter bit structure" should be interpreted as relating to holder-and-bit devices such as illustrated in Figure 22 as well as to so-called "one-piece" bit structures as elsewhere shown herein.

Modifications may be made in the invention without departing from the spirit of it. The invention having been described in certain exemplary embodiments, what is claimed as new and desired to be secured by Letters Patent is:

1. A cutter bit structure comprising a head and a rigid shank with front and rear face portions, said shank adapted to be engaged in a perforation in a socket member in a position in which at least the upper rear face portion and the lower front face portion of said shank engage wall portions of the said perforation to transmit thereto the strains of cutting, the said cutter bit having a portion resilient with respect to said rigid shank, and adapted upon resilient deflection to enter said perforation with said shank, means limiting the extent to which said shank can enter said perforation and means in connection with said resilient portion to engage behind a portion of said socket member to act non-frictionally to inhibit accidental withdrawal of said shank therefrom, said last mentioned means being shaped to produce resilient deflection of said resilient portion upon the application of deliberate force to the said cutter bit structure to withdraw the same, the said resilient portion being so located with respect to said shank as to cause said shank to occupy a position in said perforation in which at least one of the above mentioned contacts is maintained.

2. The structure claimed in claim 1 wherein said head has an upwardly presented relatively flat anvil surface to facilitate driving.

3. The structure claimed in claim 1 wherein said resilient portion is a tongue-like portion of said shank demarked from the remainder of said shank by a slot, said tongue-like portion having an outwardly extending end.

4. The structure claimed in claim 1 wherein said resilient portion is a tongue-like portion of said shank demarked from the remainder of said shank by a slot, said tongue-like portion having an outwardly extending end, said end having a slanting surface coacting with said edge portion of said socket member to tend to draw said shank into said socket member.

5. The structure claimed in claim 1 wherein said resilient portion is a tongue-like portion of said shank, said tongue-like portion having an end which extends aslant outwardly, then aslant inwardly.

6. The structure claimed in claim 1 wherein said resilient portion is a tongue-like portion of said shank, said tongue-like portion having an outwardly extending end, said cutter bit having an abutment engaging a portion of said socket member to maintain gauge when said shank is fully forced into said perforation.

7. The structure claimed in claim 1 wherein said resilient portion is a tongue-like portion of said shank, said tongue-like portion having an outwardly extending end, said cutter bit having an abutment engaging a portion of said socket member to maintain gauge when said shank is fully forced into said perforation, said cutter bit shaped to present a second abutment lying spaced from the surface of said socket member to facilitate removal by prying.

8. The structure claimed in claim 1 wherein said resilient portion is a tongue-like portion of said shank demarked from the remainder of said shank by a slot, said tongue-like portion having an outwardly extending end, said cutter bit having an abutment engaging a portion of said socket member to maintain gauge when said shank is fully forced into said perforation, said shank being wedge-shaped.

9. The structure claimed in claim 1 wherein said resilient portion is a tongue-like portion of said shank demarked from the remainder of said shank by a slot, said tongue-like portion having an end which extends outwardly, then inwardly, said cutter bit having an abutment engaging a portion of said socket member to maintain gauge when said shank is fully driven in said perforation.

10. The structure claimed in claim 1 in combination with a socket member having a perforation, the portion of said socket member behind which said resilient portion of said bit shank engages comprising an engagement surface formed within said perforation.

11. The structure claimed in claim 1 in combination with a socket member having a perforation, the said resilient portion of said cutter bit constituting a resilient tongue extending from said head in the general direction of said shank, said tongue having an outwardly slanting outer end adapted to engage a similarly shaped surface in a recess forming a part of the perforation in said socket member, when said shank is forced into said perforation whereby to prevent acidental removal of said shank.

12. The structure claimed in claim 11 in which the said outward end of said tongue bottoms on a surface of said recess to establish gauge.

13. The structure claimed in claim 1 in which the portion resilient with respect to the shank is a resilient tongue extending from said head in the general direction of said shank and shorter than said shank, said tongue having an outwardly slanting outer end.

14. The structure claimed in claim 1 wherein said resilient portion has a surface slantwise disposed to the axis of said shank to permit depression of said resilient portion and purposeful withdrawal of said shank upon the application of sufficient force.

15. The structure claimed in claim 14 in which said head is provided with an abutment engaging a portion of said socket member to maintain gauge when said shank is fully forced into said perforation.

16. The structure claimed in claim 14 in which said shank is circular in cross-section and is split by crossing slots.

17. The structure claimed in claim 14 in which said shank is circular in cross-section and is split by crossing slots, and in which said cutter bit structure has means adapted to cooperate with means on said socket member to inhibit rotation of said shank therein.

18. The structure claimed in claim 14 in which said shank is circular in cross-section, is split by crossing slots to form tongues, and in which each of said tongues has an end surface of conical, outwardly-flaring shape ending in an inwardly diminishing head surface.

19. The structure claimed in claim 14 in which said shank is circular in cross-section, is split by crossing slots to form tongues, and in which each of said tongues has an end surface of conical, outwardly-flaring shape ending in an inwardly diminishing head surface, and in which said cutter bit structure has means adapted to cooperate with means on said socket member to inhibit rotation of said shank therein.

20. The structure claimed in claim 14 in which said shank is circular in cross-section, is split by crossing slots to form tongues, and in which each of said tongues has an end surface of conical, outwardly-flaring shape ending in an inwardly diminishing head surface, said outwardly-flaring end parts adapted to engage a correspondingly conical part of said perforation.

21. The structure claimed in claim 14 in which said shank is circular in cross-section, is split by crossing slots to form tongues, and in which each of said tongues has an end surface of conical, outwardly-flaring shape ending in an inwardly diminishing head surface, said outwardly-flaring end parts adapted to engage a correspondingly conical part of said perforation, said shank otherwise being tapered.

22. The structure claimed in claim 14 in which said shank is circular in cross-section, is split by crossing slots to form tongues, and in which each of said tongues has an end part of conical, outwardly-flaring shape ending in an inwardly diminishing head surface, said outwardly flaring end parts adapted to engage a correspondingly conical part of said perforation, said head having means for interengagement with said socket member to prevent rotation of said shank in said socket.

23. The structure claimed in claim 14 in which said shank is rectangular in cross-section and of greater width than thickness, and in which said shank is split in the direction of its width.

24. The structure claimed in claim 14 in which said shank is circular in cross-section, is split by crossing slots to form tongues, and in which each of said tongues has an end surface of conical, outwardly-flaring shape ending in an inwardly diminishing head surface, said outwardly-flaring end parts adapted to engage a correspondingly conical part of said perforation, said shank otherwise being tapered, and in which said cutter bit structure has means adapted to cooperate with means on said socket member to inhibit rotation of said shank therein.

25. The structure claimed in claim 24 in which said last mentioned means is key-and-keyway means.

26. The structure claimed in claim 24 in which said last mentioned means comprises a flat on said shank.

References Cited in the file of this patent

UNITED STATES PATENTS

| | | |
|---|---|---|
| 55,423 | Lippincott | June 5, 1866 |
| 326,798 | Smith | Sept. 22, 1885 |
| 353,713 | Kinney | June 15, 1886 |
| 1,244,785 | Sessions | Oct. 30, 1917 |